(No Model.)
D. N. CALKINS.
DISINFECTANT HOLDER.
No. 597,811. Patented Jan. 25, 1898.
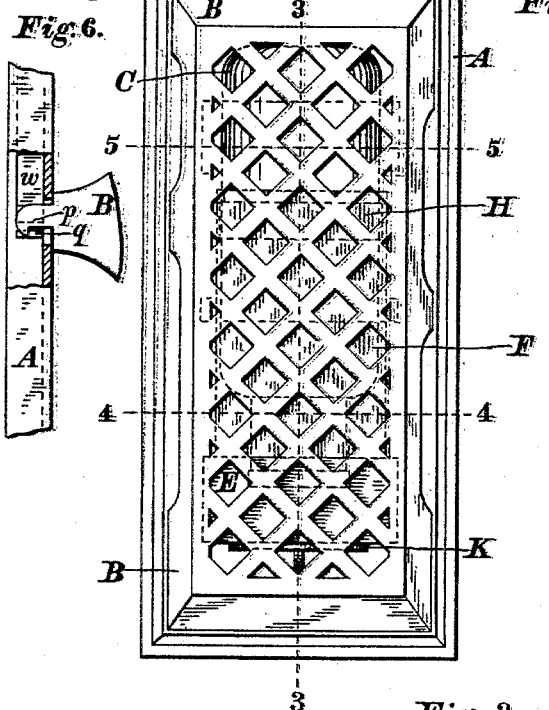
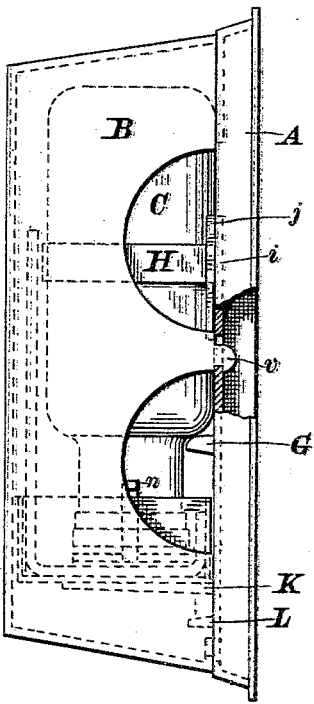
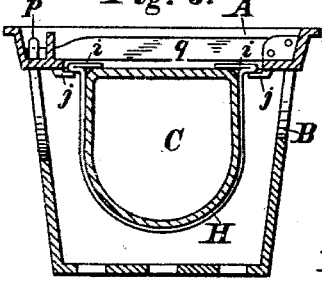
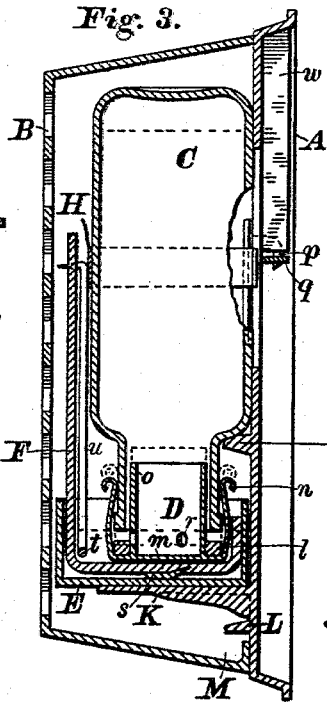
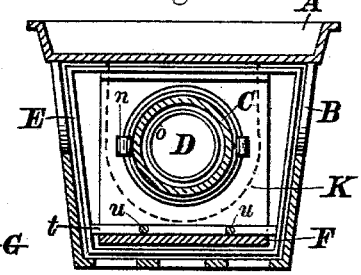
WITNESSES:
George A. Gillette
G. S. Dey
INVENTOR:
Daniel N. Calkins,
By Geo. B. Selden,
Atty.

UNITED STATES PATENT OFFICE.

DANIEL N. CALKINS, OF ROCHESTER, NEW YORK, ASSIGNOR TO THE ROCHESTER GERMICIDE COMPANY, OF SAME PLACE.

DISINFECTANT-HOLDER.

SPECIFICATION forming part of Letters Patent No. 597,811, dated January 25, 1898.

Application filed July 6, 1897. Serial No. 643,671. (No model.)

*To all whom it may concern:*

Be it known that I, DANIEL N. CALKINS, a citizen of the United States, residing at Rochester, in the county of Monroe, in the State of New York, have invented certain Improvements in Disinfectant-Holders, of which the following is a specification, reference being had to the accompanying drawings.

My invention relates to certain improvements in disinfectant-holders, which improvements are fully described and illustrated in the following specification and the accompanying drawings, the novel features thereof being specified in the claims annexed to the said specification.

In the accompanying drawings, representing my invention, Figure 1 is a front elevation. Fig. 2 is a side elevation. Fig. 3 is a central vertical section on the line 3 3, Fig. 1. Fig. 4 is a transverse section on the line 4 4, Fig. 1. Fig. 5 is a transverse section on the line 5 5, Fig. 1. Fig. 6 is a partial side view as seen from the left in Fig. 1.

My improved disinfectant-holder is designed to be attached to a wall or partition in the apartment in which it is to be used; and it consists, essentially, of the base or support A, the removable cover B, the receptacle C for the disinfecting liquid, the stopper D at the lower end of the receptacle, the cup E for holding a limited quantity of the liquid, and the absorbent material F, from the surface of which the liquid is disseminated through the atmosphere. Any suitable disinfecting liquid may be employed. In practical use, the cover being removed, the bottle or other suitable receptacle is filled with the liquid, the stopper is inserted, the receptacle is then inverted and attached to the base, with its lower end in the cup E, the stopper is pushed downward in the cup, so as to open the mouth of the receptacle and allow the liquid to fill the cup until it reaches up to and closes the mouth, after which the cover is replaced and the liquid allowed to evaporate slowly, partly from its surface and partly from the absorbent strip F as long as it lasts, the cup being automatically supplied from the receptacle by the admission of air therein as often as its surface sinks below the mouth.

The apparatus may be made of any suitable form or dimensions. The base is secured to the wall in any suitable manner. The base is provided with a lug or projection G, Figs. 2 and 3, which supports the neck of the bottle, which is preferably made, as shown in Fig. 5, with a flat side which bears against the base. A strap H extends around the bottle and secures it in place against the base, its ends being bent, as indicated at $i$, Fig. 5, and engaged with inwardly-projecting flanges $j$ on the base. An opening is formed in the base above the flanges $j$ of sufficient width to allow the ends $i$ of the strap to be detached from the flanges when the strap is slid lengthwise of the bottle.

The cup E is supported on an arm K, cast with or otherwise attached to the base, and L is a lug or ledge on the base inside the lower end of the cover which serves to limit the upward movement of the cover when it is being removed and to prevent the displacement of the cup. The cover requires to be shifted upward slightly to disengage the hooks from the base before it can be removed, and the lug L prevents this movement from being continued long enough to disturb the cup or receptacle, the lower inner edge of the cover coming into contact with the lug L.

M is a pocket or recess formed in the inside of the lower end of the cover which serves to receive any drip of liquid from the cup and to prevent its running down the wall. The recess may be formed in any suitable way, such as by a lip turned upward from the lower edge of the cover and extending all the way across.

The stopper consists of the plate $m$, the perforated tube $o$, the washer or packing $l$, and the arm or arms $n$, extending along the side of the neck. The tube is made of such a diameter as to fit freely in the neck of the bottle, and it is provided with one or more perforations $r$ just above the ring or packing $l$. The arm $n$ extends upward along the neck when the bottle is inverted and serves to depress the stopper without contact with the liquid, so as to allow the liquid to escape from the bottle into the cup until the surface of the liquid in the cup rises high enough to prevent the entrance of air into the bottle. After the bottle is inverted with its mouth in the cup the stopper is pushed downward until it bears against the bottom of the cup, thus opening a passage between the washer and the mouth of the bottle.

The absorbent material is placed in the liquid in the cup and extends upward, so as to increase the surface for evaporation. In the arrangement shown a strip of felt F is used, extending across the cup below the stopper and secured in place by the pin or lug s, Fig. 3. The felt is supported by the cross-bar t and the upright u, which is provided with a point or hook at its upper end.

The cover is made of any suitable shape, being provided with openings or perforations through which the air obtains free access to the disinfectant liquid as it evaporates slowly from the cup and the absorbent material. The cover is attached to the base by the hook v, Fig. 2, and by the hook p, Fig. 6. The hooks are made of such a shape as to engage over the lower edges of slots in the base, and one of them, as p, may be provided with a spring q, extending across the base and operating to secure the cover to the base. This spring being concealed in the base secures the cover and prevents its being removed, except by the insertion of a rod or wire through the side opening in the cover and the opening in the base, so that the cover cannot be taken off, except by a person who understands the arrangement of the spring.

w is a rib or ledge on the inside of the base which serves to guide a rod or key introduced through an opening in the upper part of the base to unlock the spring q from the hook p. The spring q is riveted to a lug on one side of the base and extends across, so as to engage with its free end, which is properly shaped, with the hook p.

My improved disinfectant-holder is cheap in construction, ornamental in appearance, and simple and efficient in practical use.

I claim—

1. The combination with the base and the removable perforated cover, of the inverted liquid-receptacle, the stopper provided with arms extending along the neck of the receptacle, the cup surrounding the mouth of the receptacle, and the absorbent material in the cup, substantially as described.

2. The combination with the base and the removable perforated cover, of the inverted liquid-receptacle, the stopper provided with arms extending along the neck of the receptacle, the cup surrounding the mouth of the receptacle, the absorbent material and a support therefor extending upward from the cup and holding the absorbent material above the surface of the liquid in the cup, substantially as described.

3. The combination with the inverted liquid-receptacle, of the stopper D, consisting of plate m having arms n, the perforated tube o, and washer l, and the cup E, substantially as described.

4. The combination with the base A, inverted liquid-receptacle C, stopper D, cup E, of the detachable cover B, having hook p and spring q, substantially as described.

5. The combination with the base A, inverted liquid-receptacle C, stopper D, and cup E, of the detachable cover B, having a pocket in its lower end for the retention of liquid, substantially as described.

DANIEL N. CALKINS.

Witnesses:
GEO. B. SELDEN,
G. S. DEY.